Aug. 18, 1925.
C. SHEARD
TRIAL FRAME
Filed Sept. 18, 1922
1,550,582
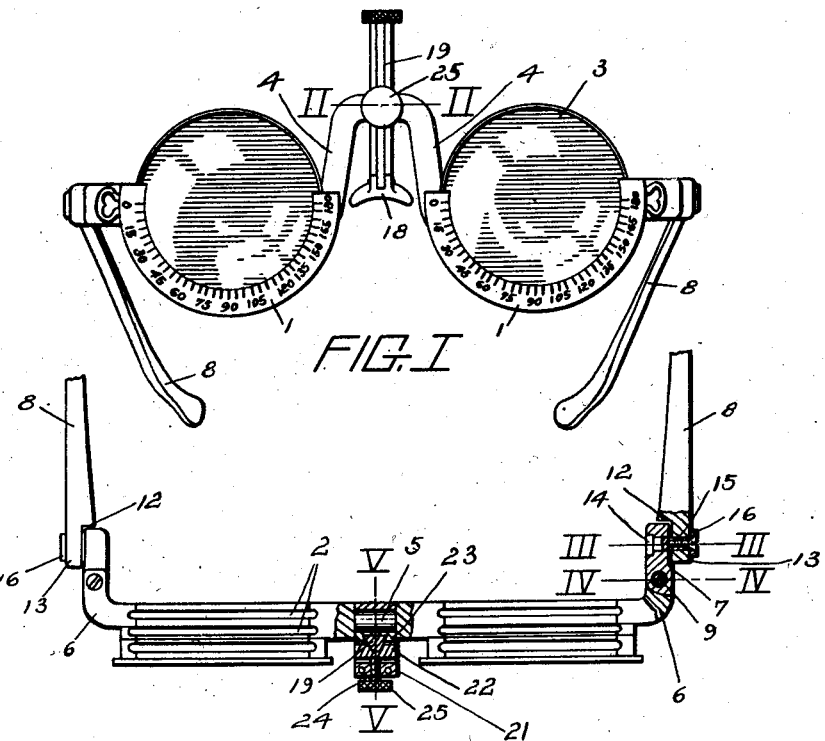
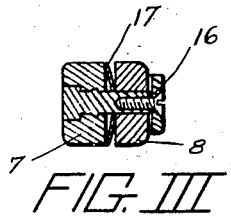
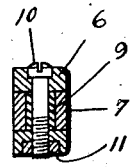
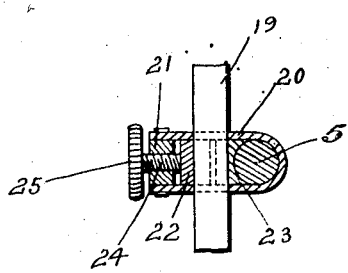
INVENTOR
CHARLES SHEARD
BY
ATTORNEYS Patented Aug. 18, 1925.

1,550,582

UNITED STATES PATENT OFFICE.

CHARLES SHEARD, OF ROCHESTER, MINNESOTA, ASSIGNOR TO AMERICAN OPTICAL COMPANY, OF SOUTHBRIDGE, MASSACHUSETTS, A VOLUNTARY ASSOCIATION OF MASSACHUSETTS.

TRIAL FRAME.

Application filed September 18, 1922. Serial No. 589,023.

*To all whom it may concern:*

Be it known that I, CHARLES SHEARD, a citizen of the United States, residing at Rochester, in the county of Olmsted and State of Minnesota, have invented certain new and useful Improvements in Trial Frames, of which the following is a specification.

This invention relates to new and useful improvements in trial frames and more particularly to trial frames formed of zylonite or other light weight material and with a non-adjustable bridge whereby in order to provide for the different P. D.'s a number of frames will constitute a set for use by an optician or a similar practitioner. The main object of my invention is the provision of a trial frame which will be extremely light in its construction and wherein the usual adjustable bridge member connecting the cells is eliminated and a continuous bridge member connects the cells upon opposite sides of the nose so that in order to provide for the different P. D.'s a plurality of these frames will be necessary to make up a complete set for use in testing the eyes.

As a general rule trial frames are made with an adjustable bridge whereby the cells may be moved toward and away from each other in accordance with the P. D. of the patient and further this type of trial frame is necessarily constructed of metal to retain the several parts in their proper operative positions and therefore makes a rather heavy unsightly frame and in a great many instances it is an uneasy task to retain the metal trial frame in proper alignment with the person's eyes. In order to do away with the heavy constructed trial frame in use at the present time I have provided a simple and efficient frame including spaced lens cells connected by a bridge member with an adjustable nose piece and the frame provided with adjustable temple members whereby said temples may be adjusted either laterally or perpendicularly so that the frame may be properly fitted to the face of the patient and it is to be understood that these frames are made in sets of varying P. D.'s for meeting the various requirements.

With the above and other objects in view the invention consists in the novel features of construction, the combination and arrangement of parts herein-after more fully set forth, pointed out in the claims and shown in the accompanying drawings, in which Figure I is a front elevation of a trial frame constructed in accordance with my invention.

Figure II is a longitudinal section taken on the line II—II of Figure I.

Figure III is a transverse sectional view taken on the line III—III of Figure II.

Figure IV is a transverse section taken on the line IV—IV of Figure II, and

Figure V is a transverse section taken on the line V—V of Figure II.

In carrying out my invention I provide a number of frames made up in accordance with the specifications herein-after fully set forth, the number of frames depending upon the size and set in which they are to be used, but for the purpose of setting forth my invention I have illustrated and described only one of the frames, it being understood that the construction will be general in the making of the various frames.

Referring now more particularly to the drawings the numeral 1 indicates the trial lens cells having three individual receiving pockets 2 formed in each of said cells for the purpose of receiving and supporting the trial lenses 3. The cells 1 are supported in spaced relation by means of the arcuate bridge member 4 having a reduced cylindrical portion 5 in the arch of the bridge as illustrated in Figure II.

In the manufacture of these frames I wish it to be understood that the cells and the other parts connected thereto are to be formed of zylonite or of similar light weight material. Connected to the cells 1 upon the outer sides thereof are the end pieces 6 having pivotally connected thereto for lateral swinging movement, the connecting members 7 which are pivotally connected at their other ends to the temples 8.

In Figure IV, I have illustrated fully the connection between the temples 8 and the end pieces 6, the connecting members 7 being provided with a substantially large opening in which is mounted a bearing sleeve 9 and extending thru this bearing sleeve 9 is the pivot pin 10 having mounted upon one end a nut 11 which is countersunk within one face of the end piece 6 to retain the screw against movement so as to securely connect the member 7 with the end piece 6.

The inner end of each of the temple members 8 is provided with a cutaway portion 12 forming a reduced end 13, the reduced end portion 13 extending parallel with the outer end of the connecting member 7 and extending thru the connecting members 7 and the end 13 of each of the temples 8 is a pivot pin 14. This pivot pin 14 extends thru one end of the member 7 and the reduced end 13 of the temple 8 and in order to retain these parts in their operative positions the end of the pin 14 is drilled and provided with screw threads whereby the screw member 16 may be readily connected with the pin 14 to retain the parts of the temple in position.

Attention is called to the fact that the temples are connected to the lens cells in such a manner as to provide for the lateral and vertical adjustment of the temples and in order to retain them in various adjusted positions vertically a spring washer 17 is interposed between the outer end of the member 7 and the end 13 so that upon tightening the screw 16 the end 13 of the temple and the outer end of the member 7 will be moved toward each other to compress the spring plate 17 for retaining the temple members 8 in their various adjusted positions.

In order to provide for the adjustment of the nose bridge 18 the bridge member is attached to the lower end of an arm which is triangular in cross section, said arm extending down midway between the side portions of the bridge member 4 and gauged with the reduced portion 5 of the bridge is a U shaped clamp 20, the ends of which are securely attached to a block 21 and arranged between the side portions of the member 20 are the bearing blocks 22 and 23, the block 23 having an arcuate end portion adapted to ride over the cylindrical portion 5 while the block 22 is connected to a screw member 24 the outer end of which has a thumb nut 25 for actuating said screw. The opposed faces of the blocks 22 and 23 are provided with recesses adapted to receive opposite portions of the arm 19 so that the arm is disposed between the two blocks and adapted to slide between said blocks and be retained against sliding movement after being adjusted.

Attention is called to the fact that by having the arm 19 arranged between the two blocks 22 and 23 the arm may be readily adjusted between said blocks or frictionally retained in an adjusted position by tightening up the screw 24 which will move the two blocks 22 and 23 toward each other bringing them into frictional contact with the arm 19. Attention is also directed to the fact that the arm 19 can be adjusted at various angles in view of the fact that the U shaped member 20 is mounted for swinging movement upon the reduced portion 5 of the bridge. The bridge member 18 can, therefore, be quickly and readily adjusted toward or away from the nose of the patient and also be readily adjusted in accordance with the position of the frame upon the face of the wearer.

It will be apparent from the above description taken in connection with the accompanying drawings that I have provided a simple, durable and efficient trial frame wherein one or more frames constitute a set, each of said frames having a different P. D. and as the frame is made of zylonite or other light weight material, the changing of the frames upon the patient's face in order to obtain the correct P. D. will not add any discomfort to the patient as each frame may be quickly and readily applied or removed and the various parts thereof readily adjusted to accommodate the same to the face of the patient in the proper manner.

What I claim is:

1. A trial frame including a series of lens cells arranged in spaced relation, a connecting member securing said cells together, an adjustable nose bridge supported by the connecting member and adapted for sliding and rotative adjustment, movable temples having connection with the outer side portion of the lens cells and adapted for adjustment in two planes at right angles to each other and means for retaining said temples in various adjusted positions.

2. A trial frame comprising a pair of lens cells having a fixed pupilary distance, a nose bridge adjustable vertically and angularly with respect to the lens cells, and temples pivoted to the outer edge of the lens cells, said temples being capable of swinging movement in two planes at right angles to one another.

3. A trial frame comprising a pair of lens cells having a fixed pupillary distance, a nose bridge adjustable vertically and angularly with respect to the lens cells, temples attached to the outer edge of the lens cells, said temples being capable of retaining the trial frame on the face of the patient.

CHARLES SHEARD.